United States Patent
Gieras et al.

(10) Patent No.: US 8,299,677 B2
(45) Date of Patent: *Oct. 30, 2012

(54) TRANSVERSE REGULATED FLUX MACHINE

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,163

(22) Filed: Dec. 4, 2009

(65) Prior Publication Data

US 2011/0133485 A1    Jun. 9, 2011

(51) Int. Cl.
*H02K 1/12* (2006.01)

(52) U.S. Cl. .................. 310/216.023

(58) Field of Classification Search ........... 310/68 R, 310/179, 180, 184, 185, 254.1, 216.019, 310/216.023, 216.035–216.039, 216.071–216.076, 310/216.079–216.082, 216.099, 216.103, 310/112–114, 266

See application file for complete search history.

(56) References Cited

U.S. PATENT DOCUMENTS

| | | | | |
|---|---|---|---|---|
| 4,451,752 A * | 5/1984 | Tahara et al. | ................. | 310/186 |
| 5,773,910 A | 6/1998 | Lange | | |
| 6,545,382 B1 * | 4/2003 | Bennett | ................... | 310/216.023 |
| 6,628,034 B2 * | 9/2003 | Jang et al. | ..................... | 310/210 |
| 6,657,329 B2 * | 12/2003 | Kastinger et al. | ........... | 310/254.1 |
| 6,936,948 B2 * | 8/2005 | Bell et al. | ...................... | 310/201 |
| 6,949,855 B2 | 9/2005 | Dubois et al. | | |
| 7,312,549 B2 | 12/2007 | Rasmussen | | |
| 7,408,327 B2 | 8/2008 | Shah et al. | | |
| 7,439,713 B2 * | 10/2008 | Dooley | ........................... | 322/22 |
| 7,459,822 B1 | 12/2008 | Johnson et al. | | |
| 7,466,058 B2 | 12/2008 | Dubois et al. | | |
| 7,472,547 B2 | 1/2009 | Grosskopf et al. | | |
| 7,474,019 B2 | 1/2009 | Kang et al. | | |
| 7,486,053 B2 | 2/2009 | Qi et al. | | |
| 7,550,953 B2 | 6/2009 | Shah | | |
| 7,560,840 B2 | 7/2009 | Lange et al. | | |
| 7,579,742 B1 | 8/2009 | Rittenhouse | | |
| 2002/0074891 A1 * | 6/2002 | Gieras et al. | .................. | 310/254 |
| 2007/0267929 A1 | 11/2007 | Pulnikov et al. | | |
| 2011/0062833 A1 * | 3/2011 | Gieras et al. | ................ | 310/68 R |

FOREIGN PATENT DOCUMENTS

| | | |
|---|---|---|
| EP | 2107665 | 10/2009 |
| WO | 9306007 | 4/1993 |
| WO | 9914116 | 3/1999 |

OTHER PUBLICATIONS

EP search report dated Apr. 18, 2011.

* cited by examiner

*Primary Examiner* — Dang Le

(74) *Attorney, Agent, or Firm* — Carlson, Gaskey & Olds, PC

(57) ABSTRACT

A machine has a rotor to be associated with a shaft. The rotor is provided with permanent magnets. A stator has pole pieces, including a main winding and flux diverters separating the main winding from a control coil. Control is provided for controlling the power passing through the control coil. The machine is a transverse flux machine. The machine may be utilized as a generator, an electric motor, or for other application.

17 Claims, 12 Drawing Sheets

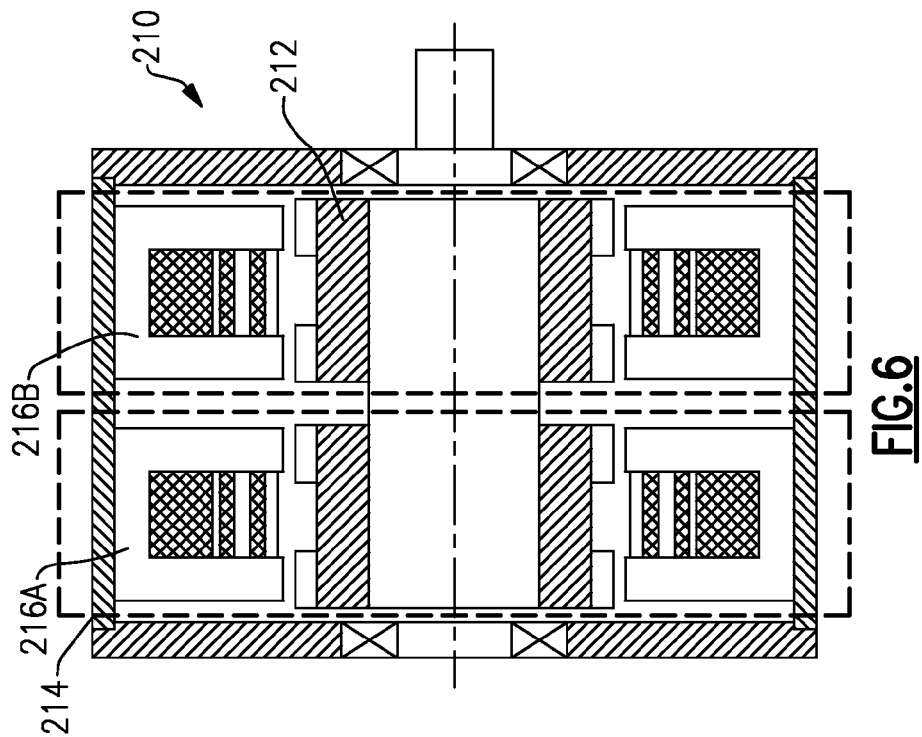
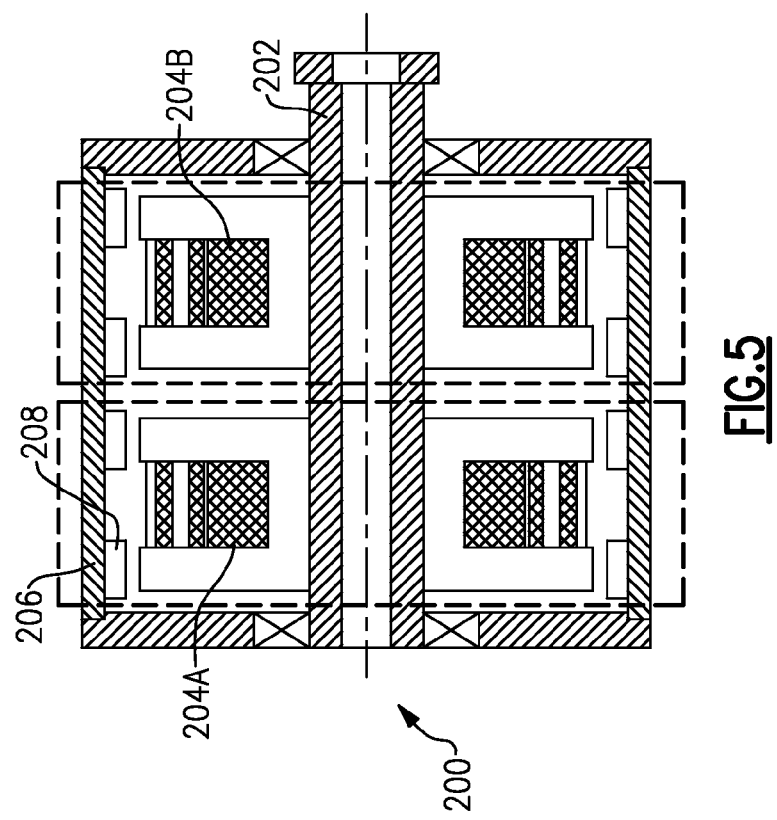
FIG.6
FIG.5

TRANSVERSE REGULATED FLUX MACHINE

BACKGROUND OF THE INVENTION

This application relates to a transverse flux machine with voltage regulation.

Typically, a permanent magnet generator or electric motor operates as a parallel flux machine. An electromagnetic force (torque) vector extends in a direction that is parallel to a flux path through a stator and rotor.

So-called transverse flux machines are also known, wherein the torque (force) vector from the flux is perpendicular to the flux path.

One challenge with the use of vehicle electric generation systems is that the prime mover, which generates rotation of a rotor in the generator, often has a variable speed. Many electrical systems need a constant voltage and frequency output, and the varying speed of the prime mover raises challenges.

Further, transverse flux machines are known which can be utilized as an electric motor. In particular, to control the electromagnetic torque provided by such motors, specific configurations for magnetic circuits must be utilized.

SUMMARY OF THE INVENTION

A machine has a rotor to be associated with a shaft. The rotor is provided with permanent magnets. A stator has pole pieces, including a main winding and flux diverters separating the main winding from a control coil. Control is provided for controlling the power passing through the control coil. The machine is a transverse flux machine. The machine may be utilized as a generator, an electric motor, or for other application.

These and other features of the present invention can be best understood from the following specification and drawings, the following of which is a brief description.

BRIEF DESCRIPTION OF THE DRAWINGS

FIG. 5 shows an embodiment of this invention.
FIG. 6 shows another embodiment of this invention.

DETAILED DESCRIPTION OF THE EMBODIMENTS

Figure 1:
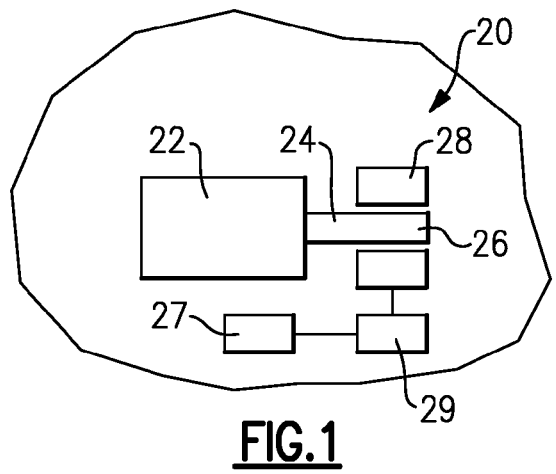
FIG. 1 schematically shows a vehicle power system.

FIG. 1 shows a vehicle 20 incorporating a prime mover 22, such as an engine. The engine may be a gas turbine engine on a vehicle, an internal combustion engine associated with the vehicle, or any other source of rotation. The prime mover 22 drives a shaft 24. The shaft 24 is associated with a rotor 26 of a generator, and a stator 28 is associated with the rotor 26. Power is tapped from stator 28 to a user, such as a power bus 29. In addition, a load 27 (e.g., a motor) is shown drawing power from the power bus 29. The machine as described below can be utilized for such an electric motor, or for the generator. This is an extremely schematic view of the basic components in a power system for the vehicle 20.

Figure 2:
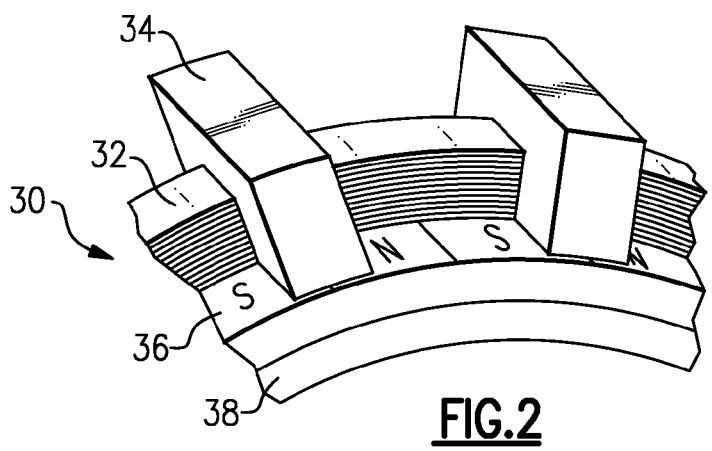
FIG. 2 shows a first embodiment architecture.

FIG. 2 shows a first arrangement 30 for a transverse flux machine, and shows a stator having cylindrical coil 32 associated with pole pieces 34. A rotor 38 is provided with permanent magnets 36.

Figure 3:
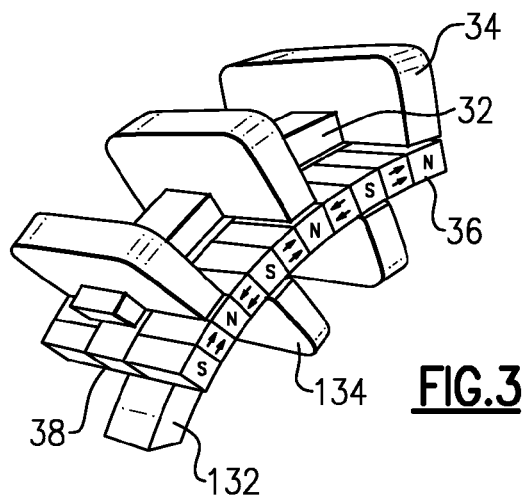
FIG. 3 shows a second embodiment architecture.

FIG. 3 shows a double-sided machine wherein there is an additional coil 132 and pole pieces 134 on an opposed side of the rotor 38. These basic arrangements of transverse flux machines can be utilized in the embodiments as set forth below.

Figure 4A:
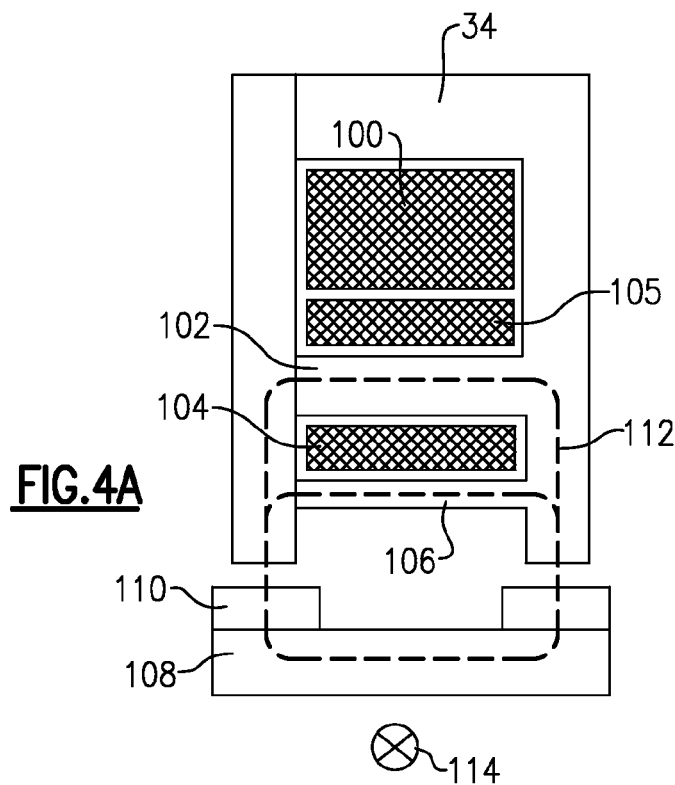
FIG. 4A shows a transverse flux regulated machine in a first condition.

FIG. 4A shows a stator and pole piece 34 having an internal armature coil 100 with flux diverters 102 and 106 separated by a control coil 104. As shown, the rotor 108 and its associated permanent magnets 110 are positioned adjacent to the pole piece 34.

In the condition shown in FIG. 4A, there is zero control current passing through the coil 104. In this condition, the permeability of the diverters 102 and 106 is high, and their reluctance is low. Almost the entire magnetic flux 112 produced by the rotor permanent magnets passes through the diverters 102 and 106, missing the armature winding 100.

Figure 4B:
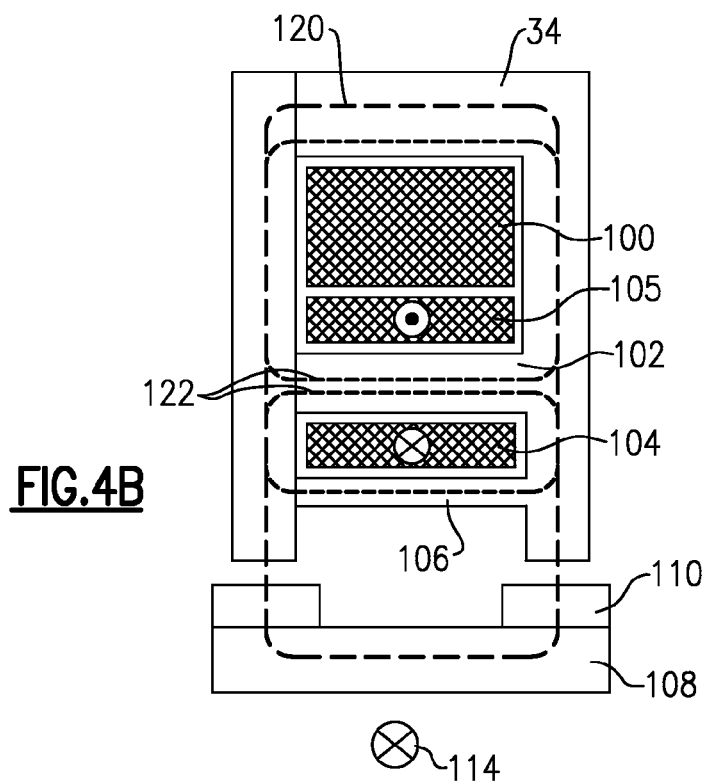
FIG. 4B shows the machine of FIG. 4A in a second condition.

As shown in FIG. 4B, the current in the control winding 104 has increased. The magnetic permeability of diverters 102 and 106 decreases and their reluctance increases.

As shown in FIG. 4B, the flux 122 passing through the diverters 102 and 106 decreases, and more flux 120 tends to pass around the armature coil 100.

As the control current continues to increase, diverters 102 and 106 become saturated, and the magnetic flux generally passes only outwardly of the coil 100 through path 120, such that flux lines from the permanent magnets 110 on the rotor 108 entirely embrace the armature winding 100.

By controlling the current in the control coil 104, the amount of flux that is associated with the armature winding 100 can be controlled, and thus the output of the machine can be controlled. Again, the control of the output may be to control the torque of an electric motor, or to control the power generation passed downstream from a generator.

As can be appreciated, the electromagnetic force vector 114 from this transverse flux machine is transverse to the flux path 112 or 120. As is also clear, the force vector 114 is transverse to the rotational axis of the rotor 108. The magnets 110 are spaced axially along the rotor 108, and at least two of the magnets 110 are associated with the pole piece 34.

In some designs the flux diverter 106 can be removed.

Figure 4C:
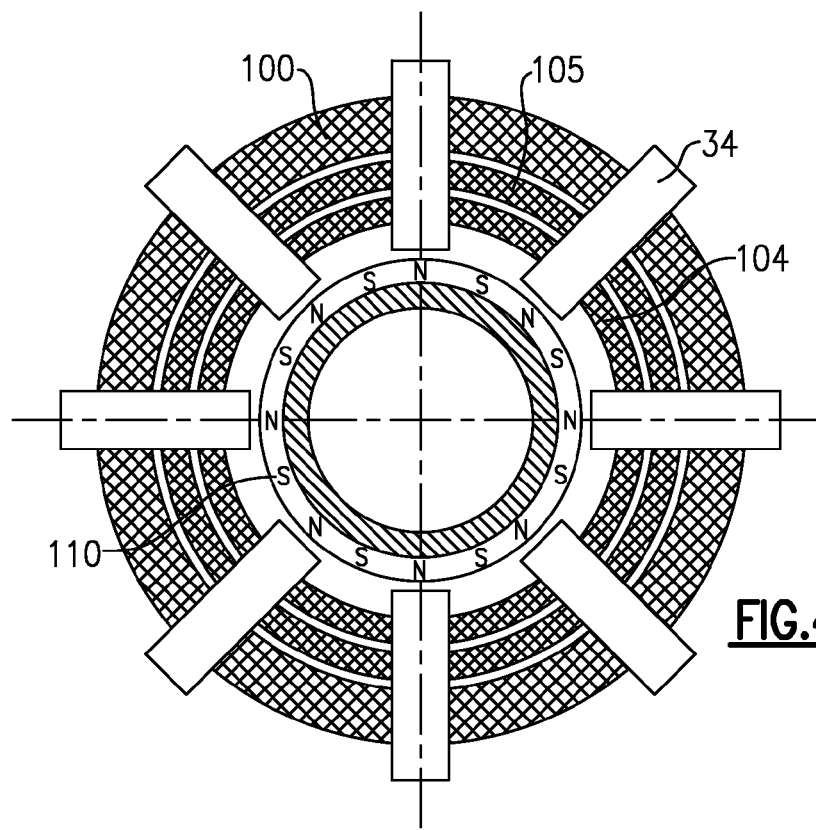
FIG. 4C shows a first potential embodiment.
Figure 4D:
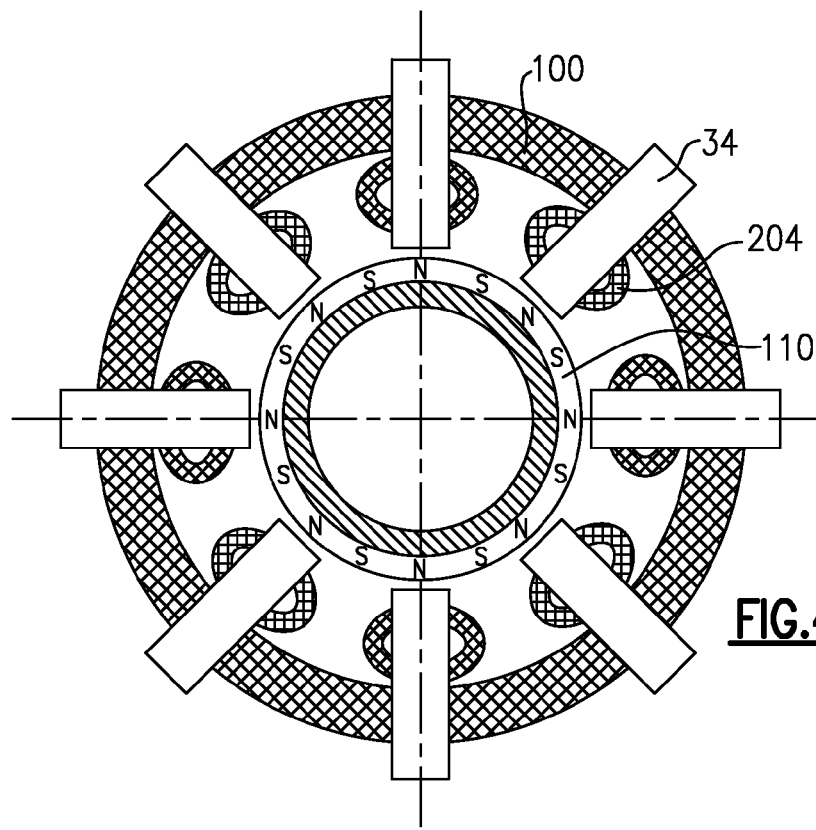
FIG. 4D shows another potential embodiment.

As shown in FIG. 4C, the pole pieces 34 can be provided with two separate cylindrical control coils 104 and 105. On the other hand, as shown in FIG. 4d, each pole piece 34 can be provided with its own control winding 204, which provides both the inner and outer control coil. All of the previously mentioned features, and all of those to be disclosed below can incorporate either of these architectures.

FIG. 5 shows a machine embodiment 200 which is single phase, and which is provided with two channels 204A and 204B, such that it is fault tolerant. The embodiment of FIG. 5 has an internal stator 202 surrounded by the rotor 206 and its permanent magnets 208. Otherwise, the machine operates much like the FIGS. 4A and 4B. In particular, the outer rotor/inner stator embodiments might be best integrated into a machine used in combination with a wheel, engine, propeller, pump, etc., wherein the inner stator may be more convenient.

FIG. 6 shows another embodiment 210, wherein the rotor 212 is internal to the stator, and its channels 216A and 216B.

Figure 7:
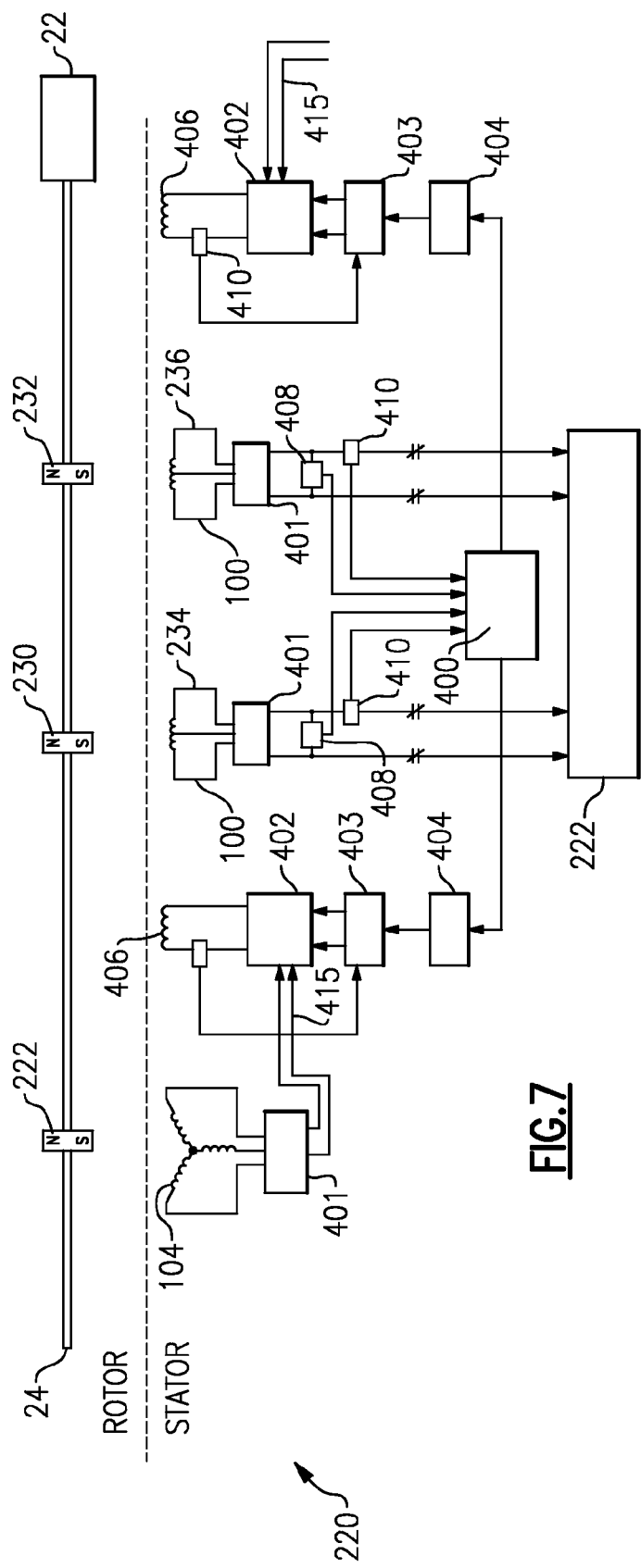
FIG. 7 shows a control circuit for the FIG. 5 and FIG. 6 embodiment.

FIG. 7 shows a system with the dual single phase arrangement associated with the FIGS. 5 and 6 embodiments. As shown, the main windings 100 are provided by separate winding sets 234 and 236 associated with the branches A and B as shown in FIGS. 5 and 6. Further, independent permanent magnet sets 230 and 232 are associated with each of these redundant sets. A central controller 400 includes a load sharing algorithm for paralleling two dc power channels connected to the load. The controller 400 derives the voltage reference signals for each channel in response to the feedback signals from voltage sensor 408 and current sensor 410.

Rectifiers 401 provide power to H-bridges 402 that control current in each control coil 406 associated with the winding sets, 234, and 236 in response to the output of the current regulators 403. The voltage regulators 404 generate current reference signals in response to the voltage reference inputs derived at the outputs of controller 400. Rectifier 401 receives power from the control power PMG stator windings 104.

Figure 8:
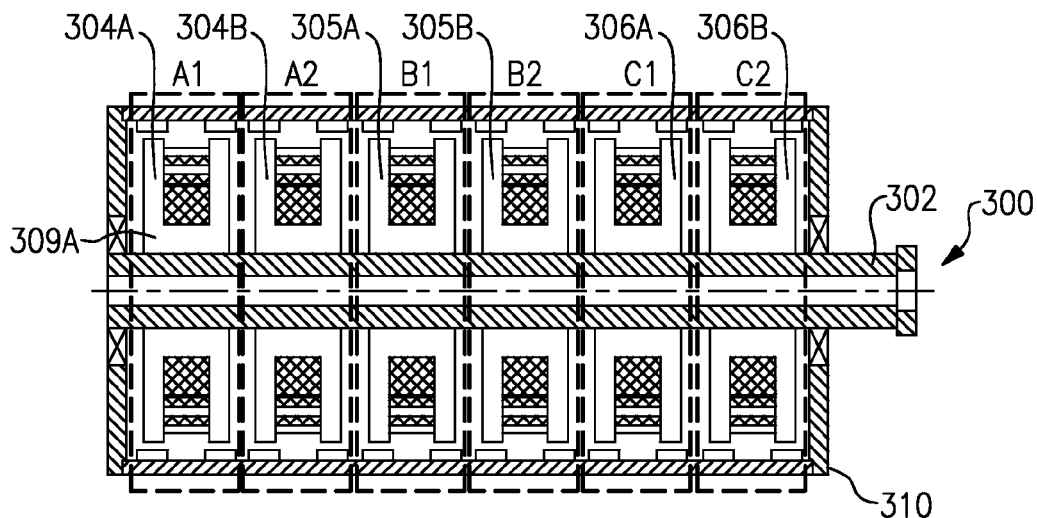
FIG. 8 shows yet another embodiment.

FIG. 8 shows a three-phase machine, again having redundant circuits for fault tolerance. In FIG. 8 machine 300, the stator 302 is internal, and includes pole pieces 304A/B, 305A/B, and 306A/B, and an external rotor 310.

Figure 9:
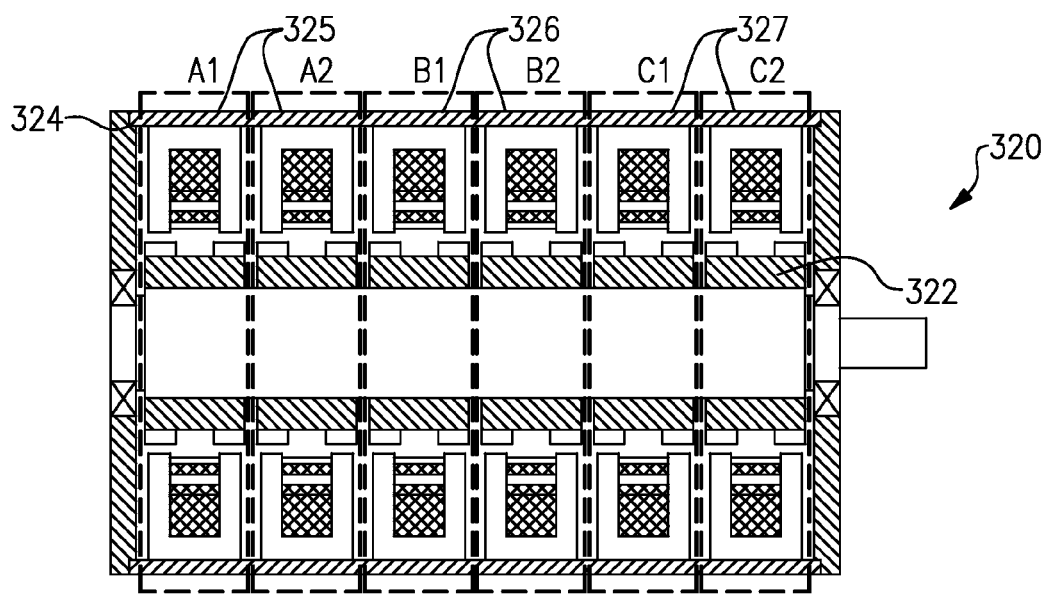
FIG. 9 shows yet another embodiment.

FIG. 9 shows an embodiment 320 having an internal rotor 322, and the redundant three-phase pole pieces 325, 326, and 327 associated with its stator housing 324.

Figure 10:
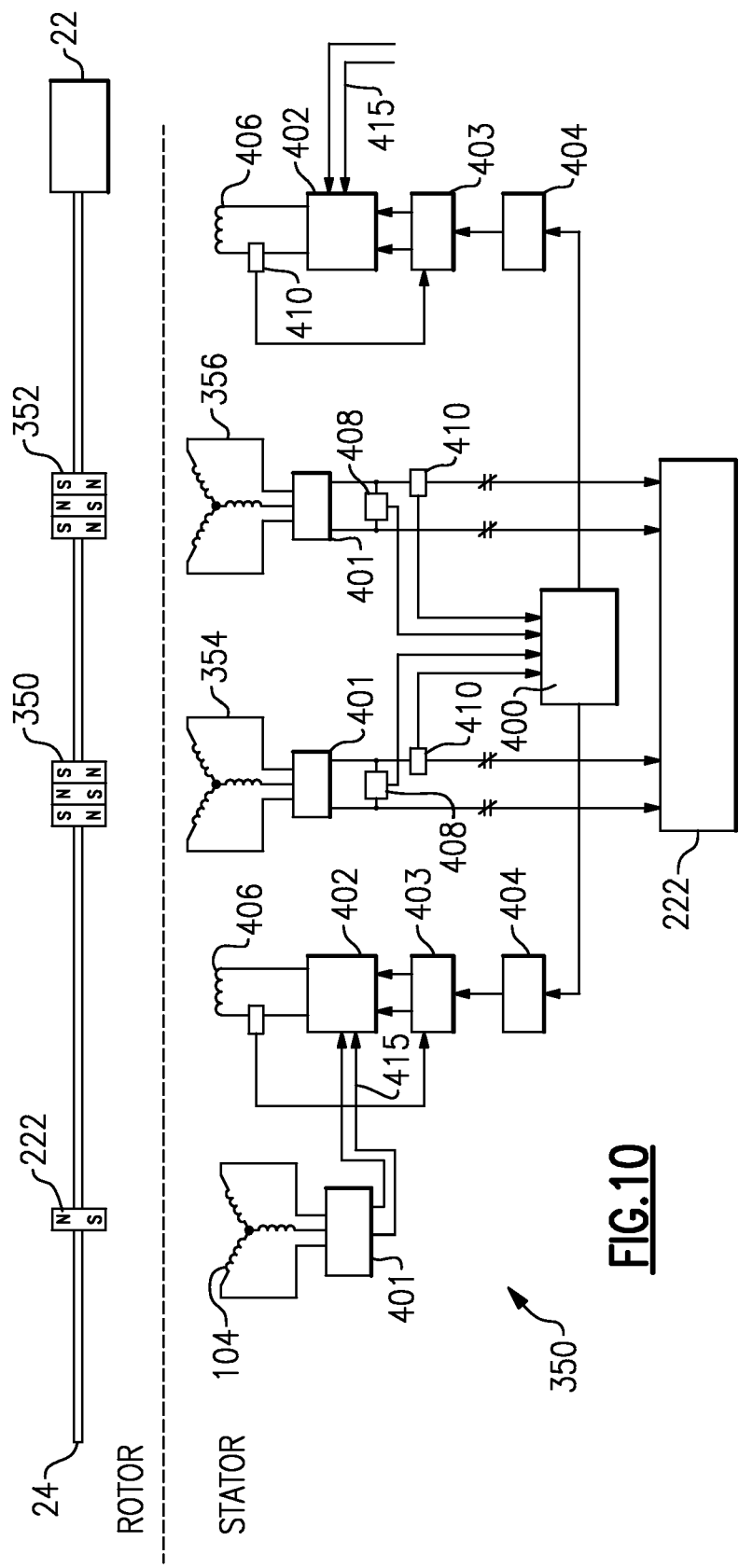
FIG. 10 shows a control circuit for the FIGS. 8 and 9 embodiments.

A control circuit 250 for the FIGS. 8 and 9 embodiment is illustrated in FIG. 10.

In FIG. 10, a control system for a three-phase generator arrangement is illustrated, and associated with the FIG. 8 and FIG. 9 embodiments. The main windings 100 are shown as two separate three-phase winding sets 354 and 356. A central controller 400 includes a load sharing algorithm for paralleling two dc power channels connected to the load. The controller 400 derives the voltage reference signals for each channel in response to the feedback signals from voltage sensor 408 and current sensor 410.

Rectifiers 401 provide power to H-bridges 402 that control current in each control coil 406 associated with the winding sets, 354, and 356 in response to the output of the current regulators 403. The voltage regulators 404 generate current reference signals in response to the voltage reference inputs derived at the outputs of controller 400. Rectifier 401 receives power from the control power PMG stator windings 104.

Figure 11:
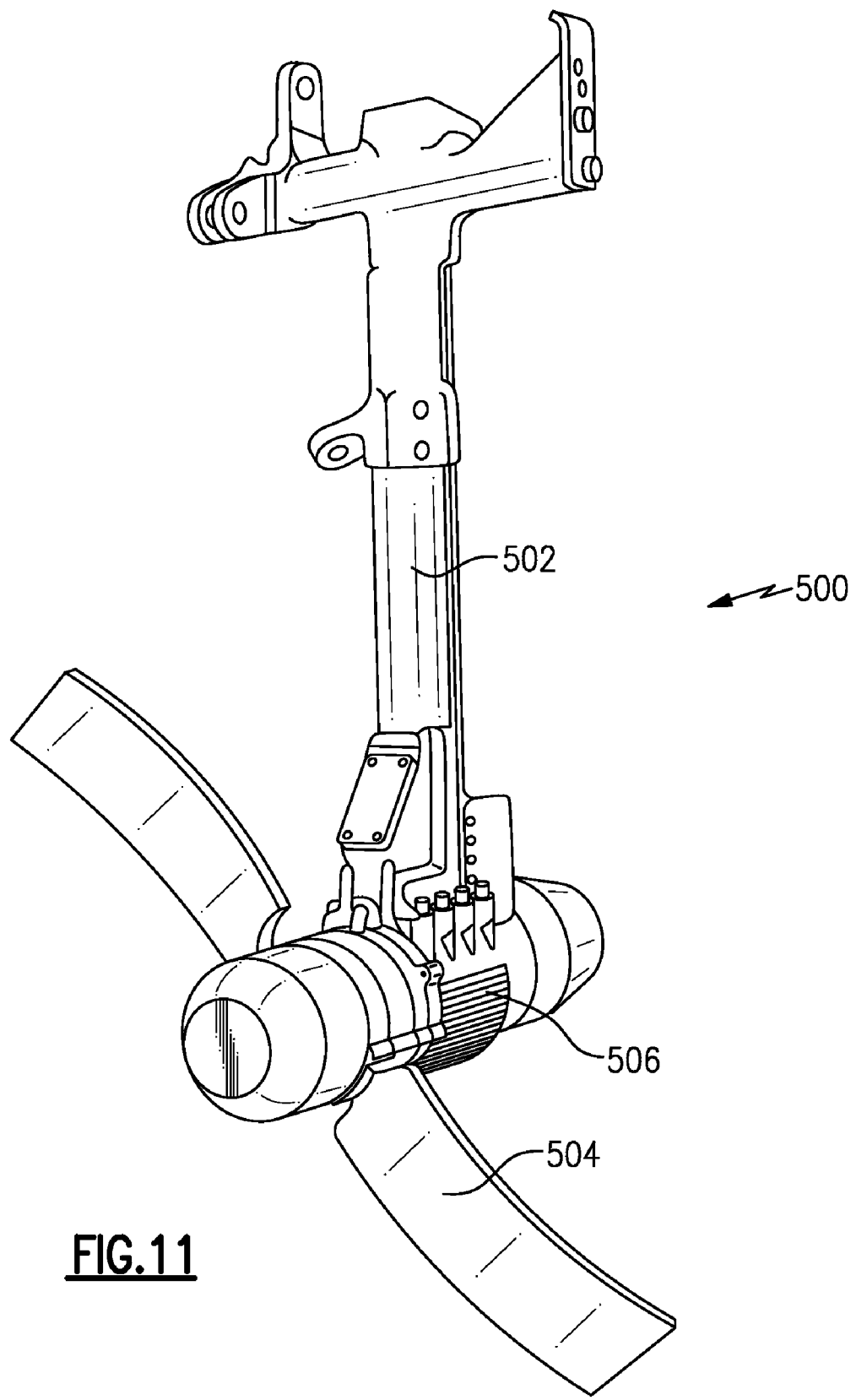
FIG. 11 shows a ram air turbine generator embodiment.

As shown in FIG. 11, an aircraft turbine generator may benefit from utilizing the machine such as disclosed in this application. Ram air turbines (RATs), such as embodiment 500 include a member 502 which can be selectively deployed when an auxiliary power unit (APU) or main engine generators fail. A blade 504 is put into the slip stream adjacent to an aircraft, and is driven to rotate. A generator 506 generates emergency power.

Figure 12:
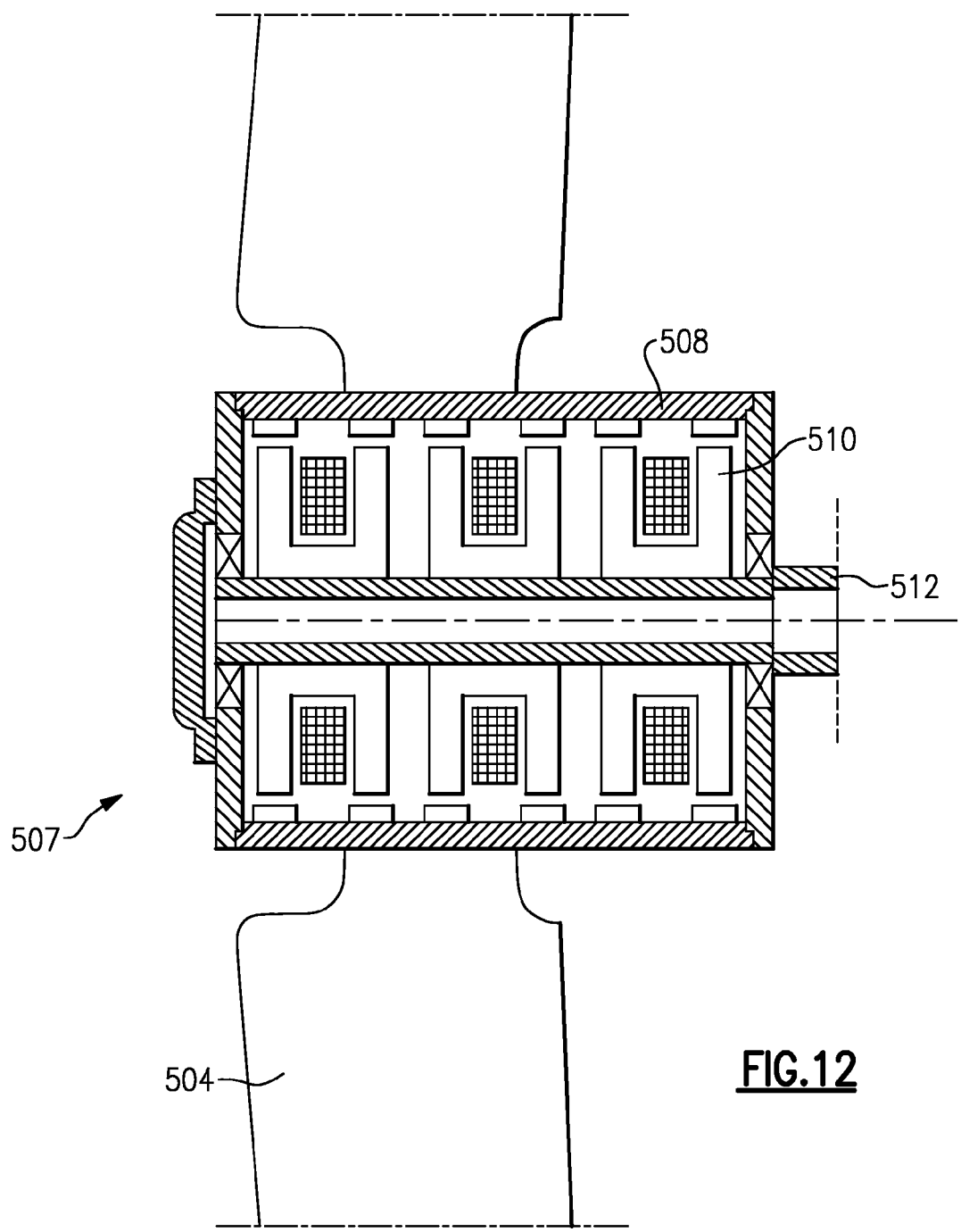
FIG. 12 shows a detail of the FIG. 11 embodiment.

As shown in FIG. 12, the RAT generator 507 may include an outer rotor 508 which rotates with pole pieces, and adjacent to control coils 510. As shown in this embodiment, three phases of power will pass to a connection 502 downstream for use on the aircraft. The machine may be any of the types previously disclosed.

Figure 13:
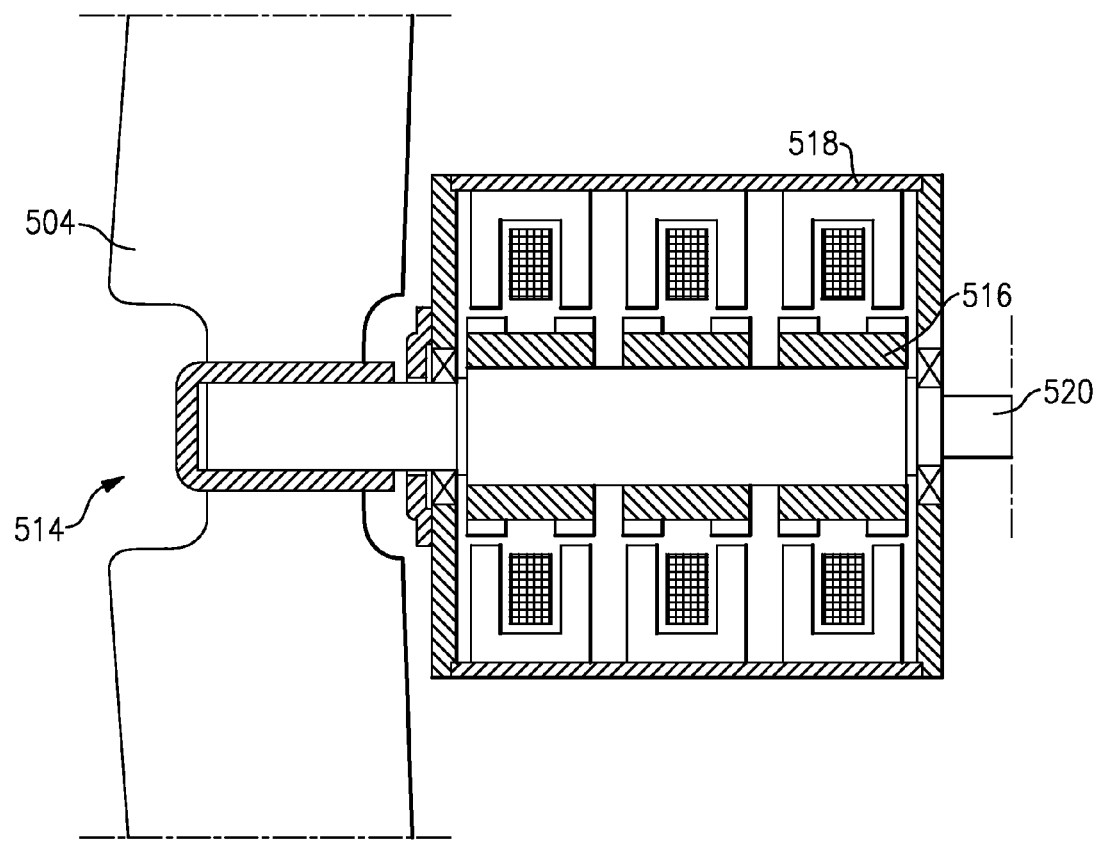
FIG. 13 shows yet another way of achieving a ram air turbine generator as shown in FIG. 11.

FIG. 13 shows another embodiment 514, wherein an internal rotor 516 is driven to rotate by the blade 504. An outer stator 518 is provided with coils, and sends generated three-phase power through a connection 520 to uses on the aircraft.

Figure 14:
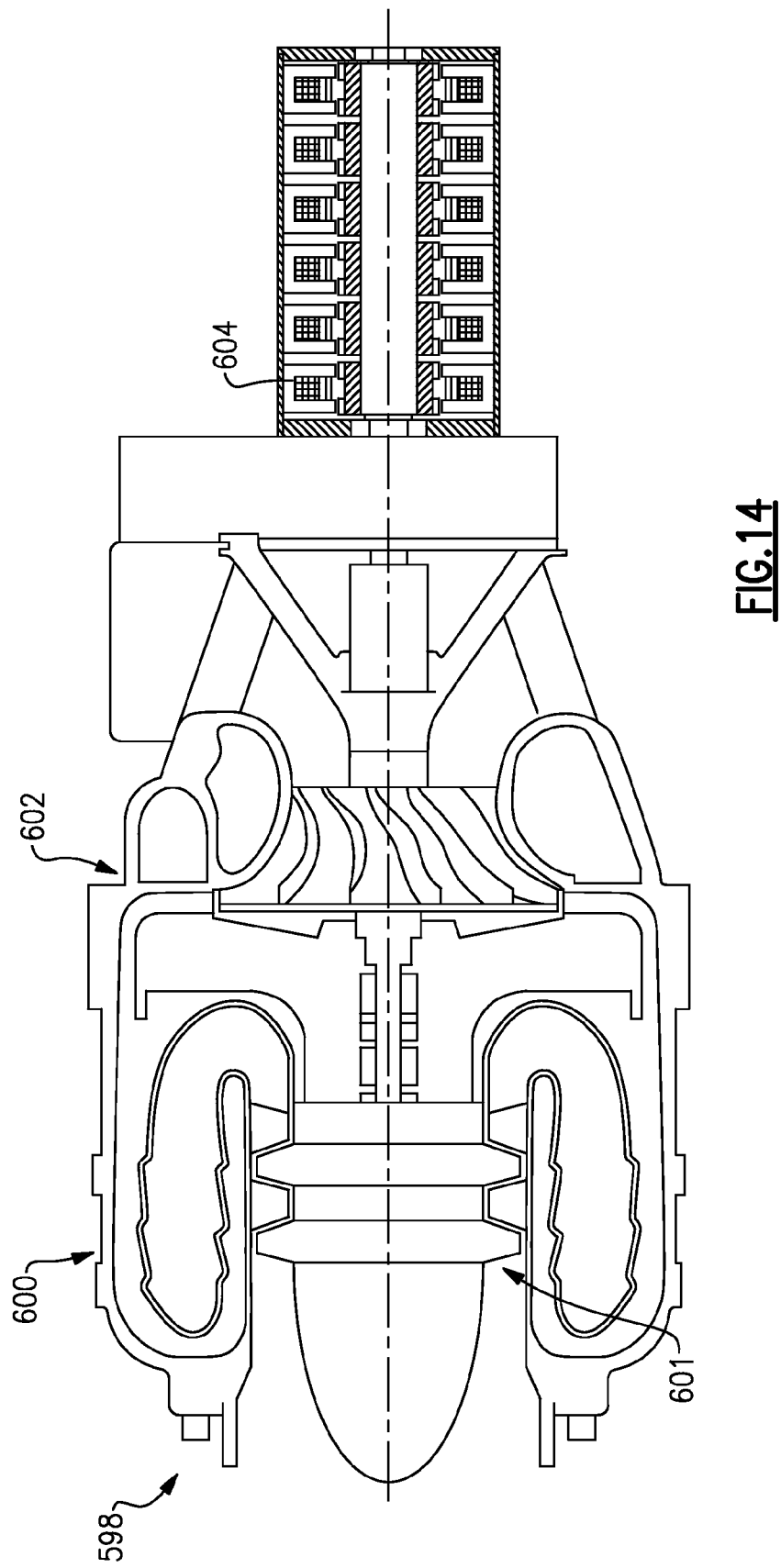
FIG. 14 shows a gas turbine engine embodiment.

FIG. 14 shows a gas turbine engine 598 incorporating a combustion section 600, turbine section 601, a compression section 602, and a transverse flux generator 604 which is driven by the turbine section 601. As shown here, the generator may be placed on an opposed side of the compressor 602 from the combustion section 600. Such application may be utilized for ground-based electrical generation, or aircraft applications such as integrated power units (IPUs) or auxiliary power units (APUs).

Figure 15:
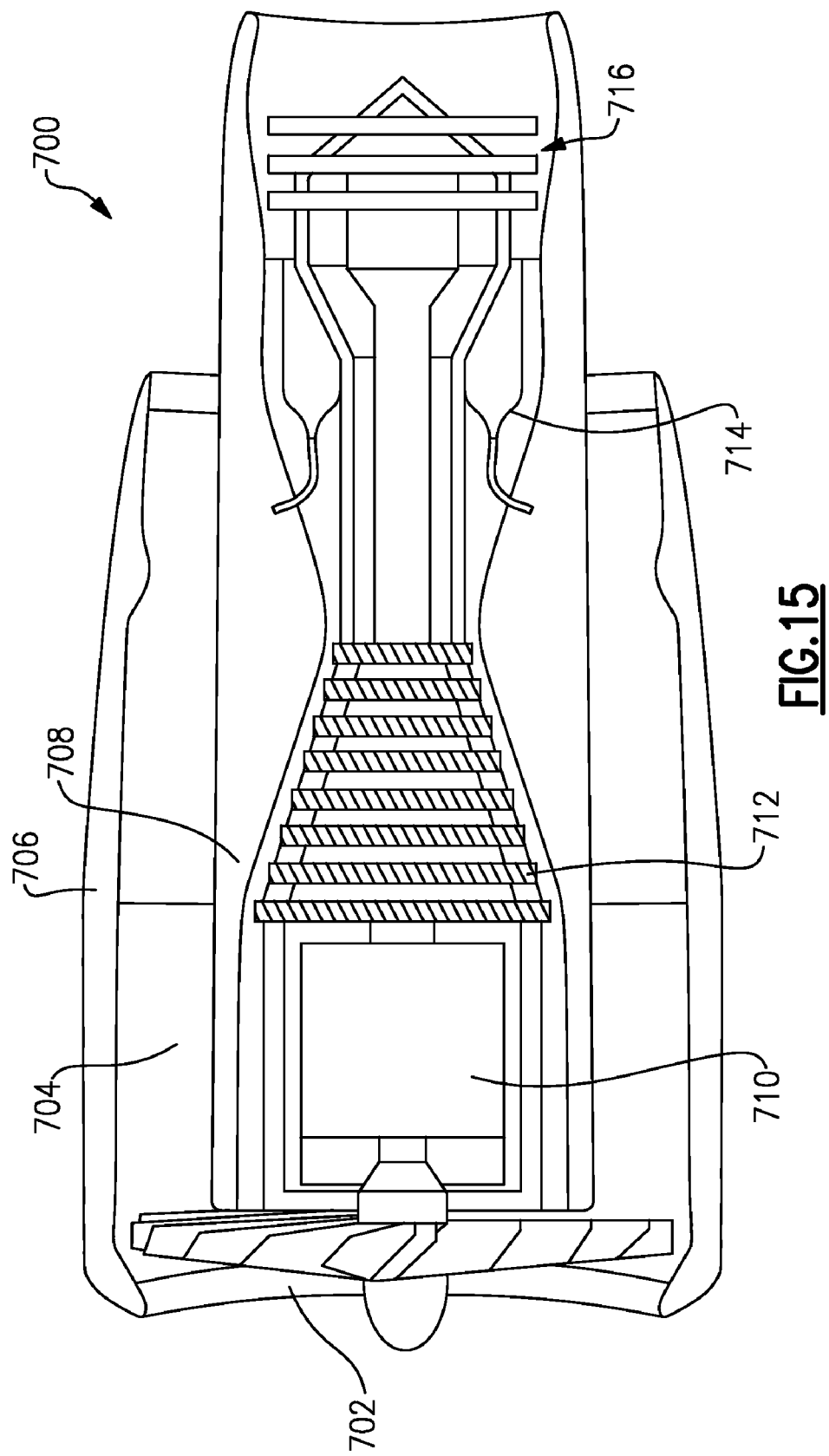
FIG. 15 shows another gas turbine engine embodiment.

FIG. 15 shows an aircraft-based application for a gas turbine engine 700. As known, a fan 702 provides air flow through an outer duct 704 between the cowl 706 and the housing 708. This air flow provides some propulsion. In addition, other portions of the air moved by the fan 702 pass through compressor section 712, then to a combustion section 714. The air is mixed with fuel and combusted in the combustion section 714, and products of this combustion pass downstream over turbine section 716. The turbine rotors 716 are driven to rotate, and power a shaft which is within the generator 710. In this manner, electricity is generated. The generator 710, or the generator 604 of the FIGS. 14 and 15 embodiments can be constructed with architecture such as shown in any of the above embodiments.

The use of the transverse flux machine provides benefits (high power density, compact construction, simple winding, low winding losses, high efficiency, modular construction) when compared to a standard flux machine. In addition, the use of the voltage regulation through the control coil provides the ability to smooth out speed differences from the prime mover.

Other applications for the basic machine include, but are not limited to pump motors, fan motors, compressor motors, wind generators, in-wheel motors (electric and hybrid electric vehicles), pod propulsors (marine applications), integrated motor-propellers (marine applications), integrated starter-generators (for land vehicles and aircrafts), hydro generators, etc.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A machine comprising:
   a rotor to be associated with a shaft, said rotor being provided with permanent magnets;
   a stator provided with pole pieces, said pole pieces including a main winding, flux diverters separating said main winding from a control coil; and
   a control for controlling the power passing through said control coil, and the stator and rotor forming a transverse flux machine, and there being a flux path through said main windings, said control coil and said flux diverters, and a force vector from the transverse flux machine being transverse to the flux path.

2. The machine as set forth in claim 1, wherein said flux diverters include a first component separating said main winding and said control coil, and a second component separating said control coil from said rotor.

3. The machine as set forth in claim 2, wherein said rotor is positioned outwardly of said stator.

4. The machine as set forth in claim 2, wherein said stator is positioned outwardly of said rotor.

5. The machine as set forth in claim 1, wherein said stator provides three or more phases of power to a load.

6. The machine as set forth in claim 1, wherein said control coil is provided with a pair of cylindrical coils, with one positioned radially inwardly of the other.

7. The machine as set forth in claim 1, wherein said control coil includes an individual control coil associated with each of said pole pieces.

8. The machine as set forth in claim 1, wherein said machine is utilized as an electric motor.

9. The machine as set forth in claim 1, wherein said machine is utilized as an electric generator.

10. The machine as set forth in claim 9, wherein said generator is a ram air turbine generator.

11. The machine as set forth in claim 10, wherein said ram air turbine generator includes a blade which is driven to rotate, and which drives an outer rotor about an inner stator on the generator.

12. The machine as set forth in claim 11, wherein said ram air turbine generator includes a blade which is driven to rotate, and which drives an inner rotor within an outer stator for the generator.

13. The machine as set forth in claim 9, wherein said generator is associated with a gas turbine engine.

14. The machine as set forth in claim 13, wherein said gas turbine engine includes a fan to provide air to a compressor section, and as propulsion air outwardly of a housing.

15. The machine as set forth in claim 1, wherein each pole piece being associated with a plurality of axially spaced magnets on said rotor.

16. The machine as set forth in claim 15, wherein said force vector is transverse to a rotational axis of said rotor.

17. The machine as set forth in claim 1, wherein said force vector is transverse to a rotational axis of said rotor.

* * * * *